US 9,956,855 B2

(12) United States Patent
Tamaoki

(10) Patent No.: US 9,956,855 B2
(45) Date of Patent: May 1, 2018

(54) VEHICULAR DOOR STRUCTURE

(71) Applicant: TOYOTA JIDOSHA KABUSHIKI KAISHA, Toyota-shi, Aichi-ken (JP)

(72) Inventor: Akihiro Tamaoki, Tajimi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 14/840,346

(22) Filed: Aug. 31, 2015

(65) Prior Publication Data

US 2016/0059678 A1 Mar. 3, 2016

(30) Foreign Application Priority Data

Sep. 1, 2014 (JP) ................................. 2014-177140

(51) Int. Cl.
*B60J 5/04* (2006.01)
*B60R 21/04* (2006.01)

(52) U.S. Cl.
CPC ............. *B60J 5/0461* (2013.01); *B60J 5/045* (2013.01); *B60J 5/0412* (2013.01); *B60J 5/0416* (2013.01); *B60J 5/0455* (2013.01); *B60J 5/0481* (2013.01); *B60R 21/0428* (2013.01)

(58) Field of Classification Search
CPC ...... B60J 5/0455; B60J 5/0456; B60J 5/0461; B60R 21/0428; B60R 2021/0414; B60R 2021/0421; F16F 7/121; F16F 7/12
See application file for complete search history.

(56) References Cited

U.S. PATENT DOCUMENTS

| 3,184,263 | A | * | 5/1965 | Plegat | B21D 13/02 49/501 |
| 3,989,275 | A | * | 11/1976 | Finch | B60R 21/0428 188/371 |
| 4,786,100 | A | * | 11/1988 | Kleemann | B60J 5/045 267/153 |
| 4,890,877 | A | * | 1/1990 | Ashtiani-Zarandi | B32B 3/30 188/371 |
| 4,919,470 | A | * | 4/1990 | Muller | B60J 5/042 296/146.7 |
| 5,026,111 | A | * | 6/1991 | Hewko | B60J 5/0425 296/146.6 |

(Continued)

FOREIGN PATENT DOCUMENTS

| CN | 1433364 A | 7/2003 |
| EP | 1279562 A1 | 1/2003 |

(Continued)

*Primary Examiner* — Justin B Rephann
(74) *Attorney, Agent, or Firm* — Oliff PLC

(57) ABSTRACT

A vehicular door structure includes a door outer panel that constitutes a door exterior panel; a door inner panel that constitutes a door interior panel and is made of a resin, the door inner panel having a first side that is provided to the door outer panel; and a door interior member located on a second side of the door inner panel, the door interior member facing to the vehicle interior, wherein the door inner panel includes a panel part that has a plurality fragile portions, the fragile portions having a linear shape or a dotted line shape and being provided in parallel with each other while being spaced from each other in at least one direction of a door width direction and a door vertical direction.

6 Claims, 4 Drawing Sheets

(56) References Cited

U.S. PATENT DOCUMENTS

| | | | | |
|---|---|---|---|---|
| 5,048,234 A * | 9/1991 | Lau | B60J 5/0416 | 296/146.7 |
| 5,306,068 A * | 4/1994 | Nakae | B60J 5/0441 | 296/146.6 |
| 5,308,138 A * | 5/1994 | Hlavaty | B60R 21/0428 | 296/146.6 |
| 5,356,177 A * | 10/1994 | Weller | B60R 21/0428 | 280/751 |
| 5,433,478 A * | 7/1995 | Naruse | B60R 21/0428 | 280/751 |
| 5,549,327 A * | 8/1996 | Rusche | B60R 21/04 | 280/751 |
| 5,564,535 A * | 10/1996 | Kanianthra | B60R 21/04 | 188/371 |
| 5,709,407 A * | 1/1998 | Stephens | B60R 13/025 | 280/751 |
| 5,716,093 A * | 2/1998 | Sadr | B60R 21/0428 | 296/146.6 |
| 5,795,013 A * | 8/1998 | Keller | B60R 13/02 | 280/751 |
| 6,036,251 A * | 3/2000 | Yagishita | B60J 5/0451 | 280/751 |
| 6,203,096 B1 * | 3/2001 | Noda | B60J 5/0451 | 280/751 |
| 6,234,526 B1 * | 5/2001 | Song | B60R 21/04 | 280/751 |
| 6,547,280 B1 * | 4/2003 | Ashmead | F16F 7/121 | 180/90 |
| 6,752,450 B2 * | 6/2004 | Carroll, III | B32B 3/28 | 188/371 |
| 6,808,224 B1 * | 10/2004 | Obara | B60J 5/0416 | 296/146.5 |
| 6,863,335 B2 * | 3/2005 | Lopez Torres | B60J 5/0455 | 296/146.7 |
| 7,357,444 B2 * | 4/2008 | Cowelchuk | B60R 21/0428 | 188/376 |
| 7,658,436 B2 * | 2/2010 | Gilleo | B60N 2/466 | 296/1.09 |
| 7,766,386 B2 * | 8/2010 | Spingler | F16F 7/125 | 280/751 |
| 7,789,455 B2 * | 9/2010 | Hall | B60J 5/0413 | 296/1.09 |
| 7,934,354 B2 * | 5/2011 | Uto | B60J 5/045 | 114/117 |
| 8,029,041 B2 * | 10/2011 | Hall | B60J 5/0451 | 296/146.6 |
| 8,091,286 B2 * | 1/2012 | Totani | B60J 5/0401 | 296/146.5 |
| 8,152,218 B2 * | 4/2012 | Hall | B60J 5/0451 | 296/146.6 |
| 8,172,311 B2 * | 5/2012 | Hughes, Jr. | B60N 2/466 | 296/1.09 |
| 8,424,954 B2 * | 4/2013 | Hall | B60N 2/4235 | 296/153 |
| 2002/0113459 A1 * | 8/2002 | Laborie | B60R 21/04 | 296/146.6 |
| 2004/0060240 A1 * | 4/2004 | Feltner | B60J 5/0412 | 49/349 |
| 2004/0124572 A1 * | 7/2004 | Tamada | B60R 19/18 | 267/136 |
| 2004/0135399 A1 * | 7/2004 | Torres | B60J 5/0455 | 296/187.12 |
| 2004/0195064 A1 | 10/2004 | Tamada et al. | | |
| 2005/0093334 A1 | 5/2005 | Koa et al. | | |
| 2006/0119136 A1 * | 6/2006 | Trombley | B60R 21/04 | 296/187.03 |
| 2006/0125291 A1 * | 6/2006 | Buravalla | B62D 21/15 | 296/204 |
| 2006/0261635 A1 * | 11/2006 | Winborn | B60J 5/0418 | 296/154 |
| 2006/0265961 A1 * | 11/2006 | Winborn | B60J 5/0418 | 49/502 |
| 2006/0265963 A1 * | 11/2006 | Winborn | B60J 5/0418 | 49/502 |
| 2007/0069548 A1 * | 3/2007 | Dooley | B60R 13/02 | 296/146.7 |
| 2007/0220812 A1 * | 9/2007 | Valentage | B60J 5/0416 | 49/502 |
| 2008/0157564 A1 * | 7/2008 | Thenier | B60J 5/0451 | 296/187.03 |
| 2008/0203749 A1 * | 8/2008 | Tamada | B60R 19/18 | 296/1.04 |
| 2009/0026800 A1 * | 1/2009 | Asenkerschbaumer | B60J 5/043 | 296/187.05 |
| 2009/0146480 A1 * | 6/2009 | Knowlden | B60N 2/4235 | 297/411.2 |
| 2009/0179454 A1 * | 7/2009 | Saida | B60R 21/0428 | 296/146.7 |
| 2010/0052360 A1 * | 3/2010 | Hsu | B60J 5/0437 | 296/146.6 |
| 2010/0194148 A1 * | 8/2010 | Fukumoto | B60R 21/34 | 296/193.11 |
| 2010/0259069 A1 * | 10/2010 | Suzuki | B60J 5/0451 | 296/187.12 |
| 2010/0300824 A1 * | 12/2010 | Totani | F16F 7/121 | 188/376 |
| 2010/0308621 A1 * | 12/2010 | Kawashima | B60R 21/04 | 296/187.05 |
| 2011/0024250 A1 * | 2/2011 | Kitashiba | F16F 7/121 | 188/376 |
| 2011/0210579 A1 * | 9/2011 | Marur | B60N 2/42709 | 296/187.03 |
| 2011/0221235 A1 * | 9/2011 | Tauchi | B60R 21/04 | 296/187.05 |
| 2012/0152674 A1 * | 6/2012 | Fukuo | F16F 7/121 | 188/377 |
| 2012/0187717 A1 * | 7/2012 | Tanaka | B64C 1/062 | 296/187.03 |
| 2013/0147172 A1 * | 6/2013 | Hirose | B60R 21/055 | 280/751 |
| 2013/0154307 A1 * | 6/2013 | Tamada | B60R 21/04 | 296/187.05 |
| 2014/0035322 A1 * | 2/2014 | Sakhara | B62D 25/02 | 296/187.12 |
| 2014/0110964 A1 * | 4/2014 | Schijve | B29C 45/006 | 296/146.6 |
| 2014/0210233 A1 * | 7/2014 | Brymerski | B60J 5/0415 | 296/191 |
| 2014/0339855 A1 * | 11/2014 | Torii | B62D 25/04 | 296/193.06 |
| 2015/0123426 A1 * | 5/2015 | Steinbrecher | B60R 13/0243 | 296/187.03 |
| 2015/0298637 A1 * | 10/2015 | Hase | B60R 21/0428 | 296/187.12 |
| 2015/0307049 A1 * | 10/2015 | Kwon | B60R 21/04 | 188/377 |
| 2015/0352929 A1 * | 12/2015 | Brar | B60J 5/0431 | 296/187.12 |

FOREIGN PATENT DOCUMENTS

| | | |
|---|---|---|
| JP | 2001206062 A | 7/2001 |
| JP | 2012101740 A | 5/2012 |
| JP | 2012214199 A | 11/2012 |
| WO | 0245987 A1 | 6/2002 |
| WO | 2007111787 A1 | 10/2007 |

* cited by examiner

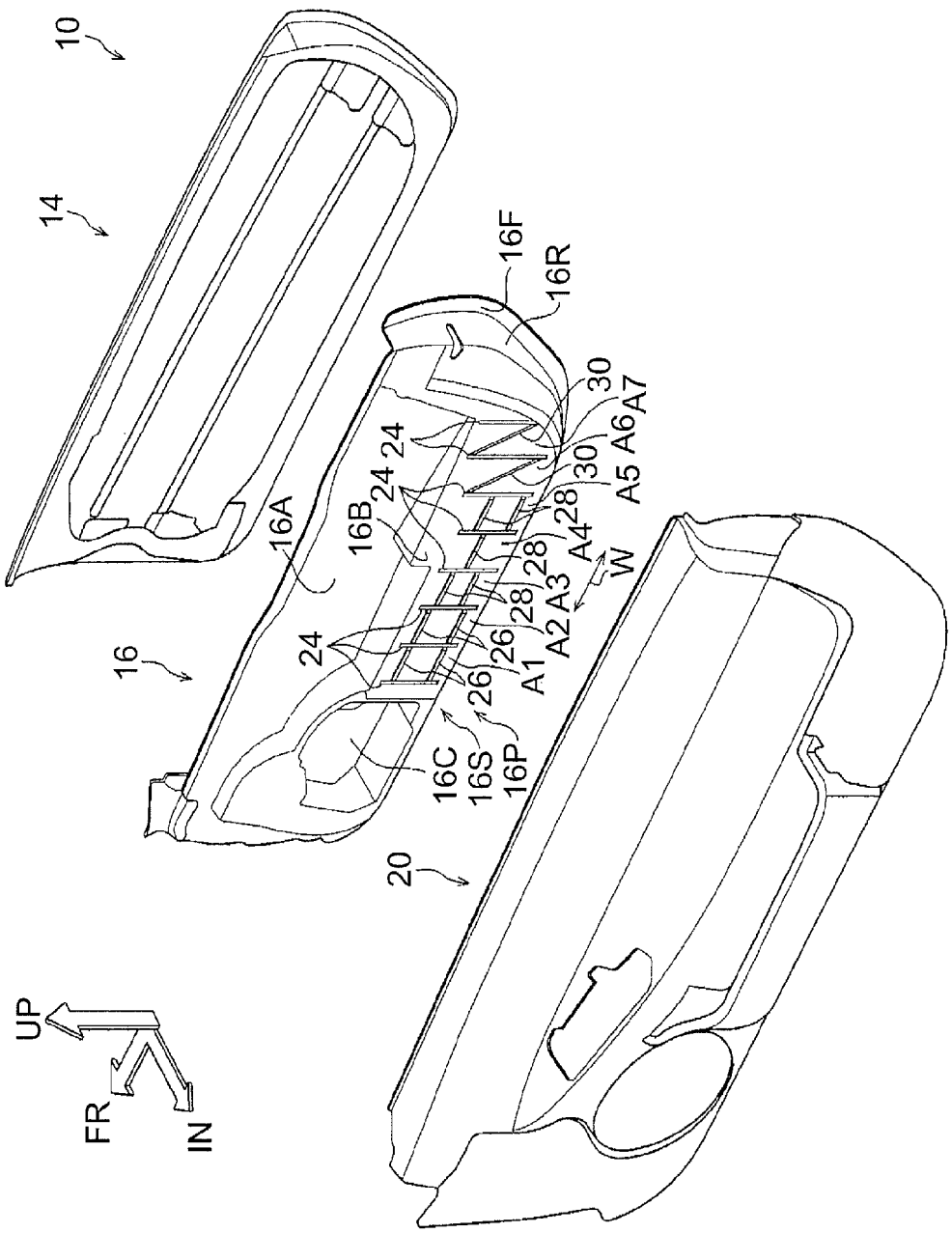

VEHICULAR DOOR STRUCTURE

INCORPORATION BY REFERENCE

The disclosure of Japanese Patent Application No. 2014-177140 filed on Sep. 1, 2014 including the specification, drawings and abstract is incorporated herein by reference in its entirety.

BACKGROUND OF THE INVENTION

1. Field of the Invention

The invention relates to a vehicular door structure.

2. Description of Related Art

In Japanese Patent Application Publication No. 2001-206062 (JP 2001-206062 A), a related art about a door made of resin, which is used as a vehicular door, is disclosed. The resin door, if briefly described, is formed by pressing a fiber reinforced resin, and is configured such that a fabric layer is provided in the whole or a part of the fiber reinforced resin. With the fabric layer thus provided, the toughness of the resin door is increased to some extent.

However, according to the related art as described above, when an impact load is applied to a door inner panel made of resin at the time of a side-impact collision with a pole or a bumper, for example, and the door inner panel cracks or breaks, the door inner panel may undergo bending deformation, thereby to protrude in V shape toward a door interior member. Thus, there is room for improvement with the object of limiting or reducing the amount of deformation of the door inner panel toward the door interior member.

SUMMARY OF THE INVENTION

This invention provides a vehicular door structure capable of limiting or reducing the amount of deformation of a door inner panel made of resin, toward a door interior member, when an impact load is applied to the door inner panel and the door inner panel is deformed.

A vehicular door structure according to one aspect of the invention includes a door outer panel, a door inner panel, and a door interior member. The door outer panel constitutes a door exterior panel. The door inner panel constitutes a door interior panel and is made of a resin. The door inner panel has a first side that is provided to the door outer panel. The door interior member is located on a second side of the door inner panel and is facing to the vehicle interior. The door inner panel includes a panel part that has plurality fragile portions. The fragile portions have a linear shape or dotted line shape and are provided in parallel with each other while being spaced from each other in at least one direction of a door width direction and a door vertical direction.

In the vehicular door structure according to the above aspect of the invention, the panel part may be opposite to the door interior member.

In this specification, the door width direction is the lateral direction when the door is seen from the front. For example, when the vehicular door structure is applied to a side door (a side door of a vehicle), the door width direction corresponds to the vehicle longitudinal direction when the door is closed. When the vehicular door structure is applied to a back door (a back door of a vehicle), the door width direction corresponds to the vehicle width direction when the door is closed.

According to the above aspect of the invention, if an impactor collides with the door outer panel, from the outside of the vehicle compartment, an impact load is applied to the door outer panel, and the door outer panel is deformed toward the door inner panel (toward the vehicle interior). Then, if the door outer panel thus deformed abuts against the door inner panel, the door inner panel is depressed or pushed by the impactor via the door outer panel.

Here, the door inner panel has the linear or dotline-shaped fragile portions in the panel part opposed to the door interior member. Therefore, if an impact load is applied to the door inner panel, and the door inner panel is depressed toward the vehicle interior, stress is concentrated in the fragile portions, and the door inner panel bends and deforms toward the vehicle interior, using the fragile portions as starting points of bending deformation. Also, the fragile portions are provided in parallel with each other while being spaced from each other in at least one direction of the door width direction and the door vertical direction. Thus, since the door inner panel bends and deforms polygonally, using the fragile portions as starting points, the amount of deformation of the door inner panel toward the door interior member is limited or reduced.

In the vehicular door structure according to the above aspect of the invention, the door inner panel may have a high rigidity portion, and the high rigidity portion may be provided between the fragile portions located next to each other and be configured to increase rigidity of a region between the fragile portions.

With the above arrangement, the rigidity of the region between the fragile portions is increased by the high rigidity portion. Therefore, when an impact load is applied to the door inner panel, deformation of the region between the fragile portions is curbed by the high rigidity portion, so that the door inner panel can be stably bent and deformed along to the fragile portions.

In the vehicular door structure as described above, the high rigidity portion may connect the fragile portions located next to each other.

With the above arrangement, the high rigidity portion increases the rigidity of the region between the fragile portions located next to each other, over the entire length of the region. Accordingly, when an impact load is applied to the door inner panel, deformation of the region between the fragile portions is further stably curbed by the high rigidity portion; therefore, the door inner panel can be further stably bent and deformed along the fragile portions.

In the vehicular door structure as described above, the high rigidity portion may extend in an oblique direction relative to the door width direction.

With the above arrangement, the high rigidity portion extends in the oblique direction relative to the door width direction, so that the rigidity can be increased in a given range in the door width direction and a given range in the door vertical direction. Therefore, the range to which the rigidity is given by one high rigidity portion can be expanded or made larger, as compared with the case of a high rigidity portion extending in the door width direction or the door vertical direction as viewed from the front of the door. Accordingly, the range to which the rigidity can be given by the high rigidity portion can easily cover widely varying collision positions of the impactor. In this connection, the range to which the rigidity can be given may be regarded as a range that can contribute to stable bending deformation of the door inner panel.

As explained above, according to the vehicular door structure of the above aspect of the invention, when the door inner panel made of resin is deformed upon application of an impact load to the panel, the amount of deformation of the door inner panel toward the door interior member can be limited or reduced.

In the vehicular door structure as described above, the high rigidity portion may include a rib.

In the vehicular door structure as described above, the high rigidity portion may have at least one of a convex bent portion and a concave bent portion provided in the panel part.

In the vehicular door structure as described above, the high rigidity portion may include a large-thickness portion having a larger thickness than the other portions of the panel part.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is an exploded perspective view showing the side door to which the vehicular door structure according to the embodiment of the invention is applied;

FIG. 3A and FIG. 3B are planar cross-sectional views schematically showing a condition where an impactor collides with a door outer panel, from the outside of the vehicle compartment, wherein FIG. 3A shows a condition after the door outer panel is deformed and before the door outer panel abuts against the door inner panel, and FIG. 3B shows a condition where the door inner panel is deformed after the door outer panel abuts against the door inner panel; and FIG. 4A through FIG. 4E are views each showing a principal part of a door inner panel according to a modified example when viewed from a door trim, wherein FIG. 4A shows a first modified example, FIG. 4B shows a second modified example, FIG. 4C shows a third modified example, FIG. 4D shows a fourth modified example, and FIG. 4E shows a fifth modified example.

DETAILED DESCRIPTION OF EMBODIMENTS

Figure 1:
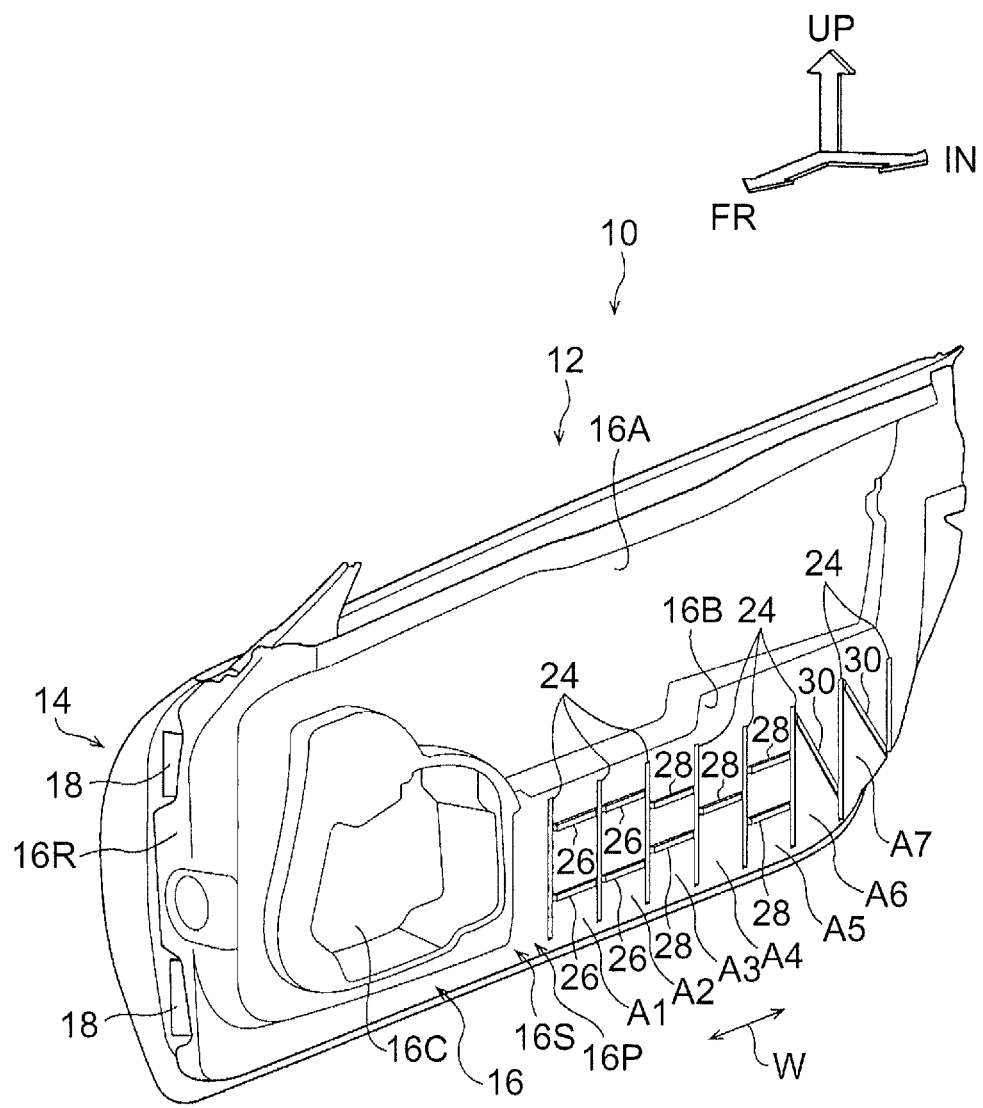
FIG. 1 is a perspective view showing a door body of a side door to which a vehicular door structure according to one embodiment of the invention is applied.

A vehicular door structure according to one embodiment of the invention will be described with reference to FIG. 1 through FIG. 3B. In these figures, arrow FR indicates the front side of the vehicle, and arrow UP indicates the upper side of the vehicle, while arrow IN indicates the inner side in the vehicle width direction. Also, arrow W indicates the door width direction as the lateral direction when the door is viewed from the front.

FIG. 2 is an exploded perspective view of a side door 10 of an automobile to which the vehicular door structure according to this embodiment is applied. The side door is arranged to close one of door openings (not shown) formed in opposite side portions of a cabin of the automobile, and is able to pivot about a door hinge.

As shown in FIG. 2, the side door 10 includes a door outer panel 14 that is located on the outer side (the right-hand side in FIG. 2) of the vehicle compartment and constitutes a door exterior panel. The door outer panel 14 forms the design of the side door 20 when viewed from the outside of the automobile, and is made of metal (as one example, made of aluminum alloy). The side door 10 also includes a door inner panel that constitutes a door interior panel. The door inner panel 16 is located on one side (the left-hand side in FIG. 2) of the door outer panel 14 closer to the vehicle interior when the side door 10 is in a closed state. The door inner panel 16 is made of fiber reinforced resin (FRP). In this embodiment, the fiber reinforced resin is carbon-fiber reinforced resin (CFRP).

The door inner panel 16 includes a side wall 16S that is opposed to the door outer panel 14. In a lower portion of the side wall 16S, a lower general portion 16B is formed in a region that extends from a middle portion in the door width direction to one side (the right-hand side in FIG. 2) opposite to the door hinge. The lower general portion 16B bulges or protrudes to be closer to a door trim 20 which will be described later (on the near side in FIG. 2), than an upper portion (upper general portion 16A) of the side wall 16S. A loudspeaker housing portion 16C is formed on the door hinge side (the left-hand side in FIG. 2) relative to the lower general portion 16B. A peripheral wall 16R is formed which extends from the peripheral edge of the side wall 16S excluding the upper end thereof, toward the door outer panel 14. Also, a flange portion 16F that is opposed to an outer peripheral portion of the door outer panel 14 extends from an end edge of the peripheral wall 16R closer to the door outer panel 14. The outer peripheral portion of the door outer panel 14 is fixed by hemming to the flange portion 16F of the door inner panel 16.

FIG. 1 shows a condition where the door outer panel 14 and the door inner panel 16 are joined to each other. The door outer panel 14 and the door inner panel constitute a bag-like door body 12. Also, hinge reinforcements 18 made of metal are attached to a front end portion of the peripheral wall 16R of the door inner panel 16.

As shown in FIG. 2, the side door 10 includes the door trim 20 as a door interior member located on one side (the left-hand side in FIG. 2) of the door inner panel 16 closer to the vehicle interior when the side door 10 is in the closed state. The door trim 20 is made of resin, and the door inner panel 16 is upholstered or covered with the door trim 20. In one example, an outer peripheral portion of the door trim 20 including four corners (upper, lower, left and right corners) is attached to the door inner panel 16 by means of clips (not shown), or the like. The entire area of the door trim 20 is opposed to the door inner panel 16.

Figure 3A:
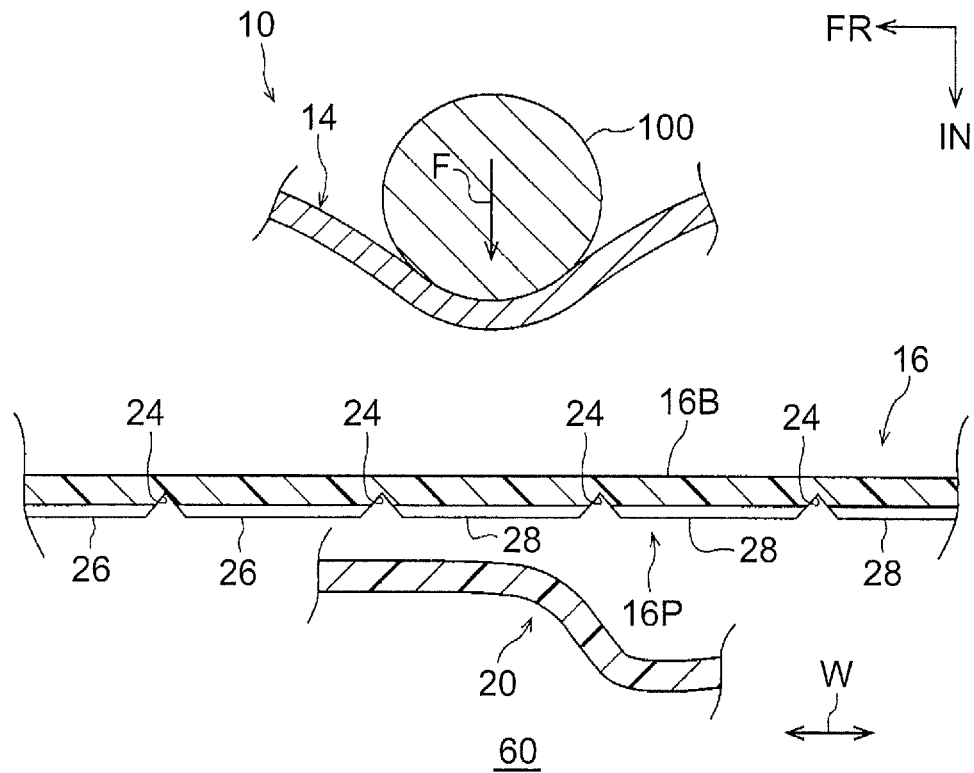

The door inner panel 16 includes the above-described lower general portion 16B as a portion of a panel part 16P opposed to the door trim 20. In the lower general portion 16B, notches 24 serving as a plurality of linear fragile portions are formed in parallel with each other while being spaced at given intervals (a fixed interval as one example) in the door width direction W. As shown in FIG. 3A, the notches 24 are provided in one surface of the door inner panel 16 which is opposed to the door trim 20. Each of the notches 24 is a V-shaped groove as viewed in a planar cross-section, and extends along a straight line in the door vertical direction (see FIG. 1). The notches serve as starting points of bending deformation when an impact load of a given value or larger is applied from the door outer panel side to the door inner panel 17 (see FIG. 3B).

As shown in FIG. 1, on the door inner panel 16, ribs 26, 28, 30 as high rigidity portions are formed between the linear notches 24 located next to each other. The ribs 26, 28, 30 are provided on the same surface on which the notches 24 are formed, and protrude toward the door trim 20 (see FIG. 2). The ribs 26, 28, 30 connect the linear notches 24 located next to each other, so as to increase the rigidity of portions between the corresponding linear notches 24. In this embodiment, opposite end faces of each of the ribs 26, 28, 30 as viewed in the direction of extension of the ribs serve as inclined surfaces that extends from inclined surfaces of the corresponding notches 24 (see FIG. 3A).

In the following description, respective regions between the notches 24 located next to each other will be called "first region A1", "second region A2", "third region A3", "fourth region A4", "fifth region A5", "sixth region A6", and "seventh region A7", starting from the left in the figures, for the sake of convenience. Also, the ribs 26 formed in the first region A1 and the second region A2 will be called "first ribs" when appropriate, and the ribs 28 formed in the third region A3, fourth region A4 and the fifth region A5 will be called "second ribs" when appropriate, while the ribs formed in the sixth region A and the seventh region A7 will be called "third ribs" when appropriate.

The first rib 26 and the second rib 28 extend linearly in the door width direction W. A plurality of first ribs 26 (two as one example) are formed in each of the first region A1 and the second region A2. The positions of the first ribs in the first region A1 are the same as those of the first ribs 26 in the second region A2, in the door vertical direction. In other words, the vertical interval of the first ribs 26 in the first region A1 is equal to the vertical interval of the first ribs 26 in the second region A2.

A plurality of second ribs 28 (two as one example) are formed in each of the third region A3 and the fifth region A5, and one second rib 28 is formed in the fourth region A4. The vertical interval of the second ribs 28 in the third region A3 is different from the vertical interval of the second ribs 28 in the fifth region A5.

In this embodiment, one third rib 30 is formed in each of the sixth region A6 and the seventh region A7, and extends in an oblique direction (as one example, in a direction in which it is inclined to the lower side of the door, toward the rear side of the door) relative to the door width direction W.

Next, the operation and effect of this embodiment will be described.

As shown in FIG. 3A, when a pole 100 as an impactor collides with the door outer panel 14, from the outside of the vehicle compartment, an impact load F that arises at this time is applied to the door outer panel 14, and the door outer panel 14 deforms toward the door inner panel 16 (toward the vehicle interior 60). Then, if the door outer panel 14 thus deformed abuts against the door inner panel 16, the door inner panel is depressed or pushed by the pole 100 via the door outer panel 14.

Figure 3B:
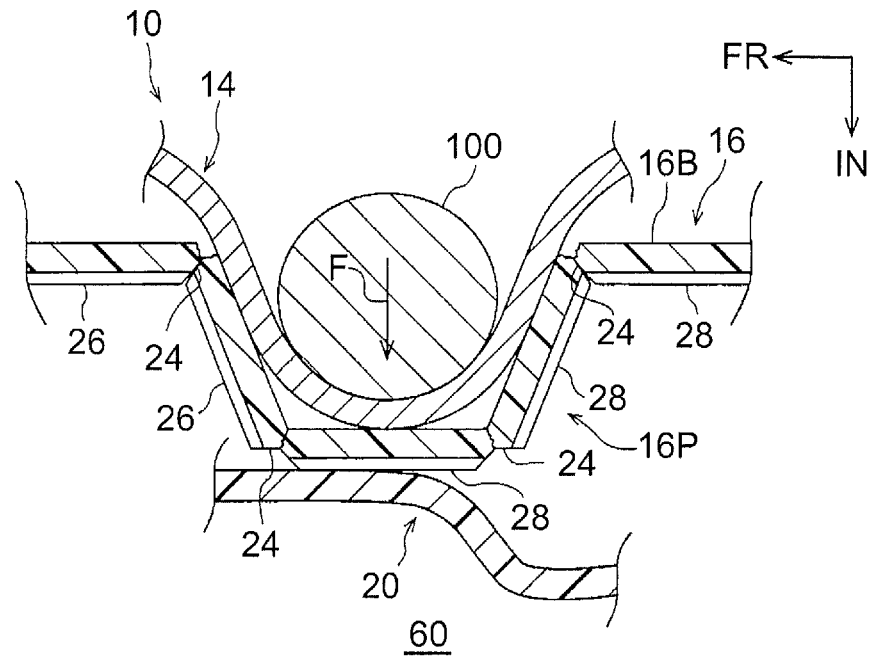

The door inner panel 16 has the linear notches 24 that serve as starting points of bending deformation, on the panel part 16P (the lower general portion 16B) opposed to the door trim 20. Therefore, if the door inner panel 16 to which the impact load F is applied is depressed or pushed toward the vehicle interior 60, as shown in FIG. 3B, stress is concentrated in the portions in which the linear notches 24 are formed, and the door inner panel 16 bends and deforms to the vehicle interior 60 side, using the notches 24 as starting points. Also, as shown in FIG. 3A, the plurality of linear notches 24 are provided in parallel with each other while being spaced from each other in the door width direction W. Therefore, as shown in FIG. 3B, the door inner panel 16 bends and deforms polygonally, along the shape of the door outer panel 14 deformed by the pole 100. As a result, the amount of deformation (amount of protrusion) of the door inner panel 16 toward the door trim 20 is limited or reduced.

Here, supplementary explanation will be provided with respect to the resin material used in this embodiment of the invention. The resin material (including the fiber reinforced resin material in this embodiment) is much less likely to expand than a steel material or an aluminum alloy material; therefore, the resin material is likely to crack or break if it is strained with stress applied thereto. While a panel member made of steel or aluminum alloy undergoes plastic deformation to be deformed along the impactor at the time of collision, a panel member made of resin (including fiber reinforced resin) may crack upon collision, and undergo bending deformation so as to protrude in V shape to the side opposite to the collision. Therefore, if this type of panel member is used as the door inner panel, and the door inner panel undergoes bending deformation at the time of collision, it may be considered that the door inner panel abuts against a door interior member. In this embodiment, the door inner panel 16 bends and deforms polygonally, whereby the amount of deformation of the door inner panel 26 toward the door trim is limited or reduced, as compared with the one that bends and deforms in V shape. Thus, the door inner panel 16 is prevented from abutting against the door trim 20, or is less likely to abut against the door trim 20.

Also, in this embodiment, the ribs 26, 28, 30 are formed on the door inner panel between the linear notches 24 located next to each other, and the rigidity of regions between the linear notches 24 is increased by the ribs 26, 28, 30, as shown in FIG. 1. Therefore, when an impact load F is applied to the door inner panel 16, as shown in FIG. 3B, deformation of the regions between the linear notches 24 is curbed by the ribs 26, 28, 30 (see FIG. 1); therefore, the door inner panel 16 can be stably bent and deformed along the linear notches 24.

Also, in this embodiment, the linear notches located next to each other are connected by the ribs 26, 28, 30, as shown in FIG. 1 and FIG. 3A. Therefore, the rigidity of the regions on which the ribs 26, 28, 30 are formed is increased by the ribs 26, 28, 30, over the entire lengths of the portions between the linear notches 24 located next to each other. Accordingly, when an impact load F is applied to the door inner panel 16, as shown in FIG. 3B, deformation of the regions between the linear notches 24 is further stably curbed by the ribs 26, 28, 30 (see FIG. 1), and therefore, the door inner panel 16 can be further stably bent and deformed along the linear notches 24.

In this embodiment, as shown in FIG. 1, the third rib 30 extends in the oblique direction relative to the door width direction W, so that the rigidity can be increased in a given range in the door width direction W and a given range in the door vertical direction. Therefore, the range to which each rib can give rigidity is made larger than that in the case of ribs that extend in the door width direction W or the door vertical direction as viewed from the front of the door. Accordingly, the door inner panel 16 having the third ribs 30 is able to easily cover widely varying collision positions of the impactor. Here, the range to which each rib can give rigidity may be regarded as a range in which the rib can contribute to stable bending deformation of the door inner panel 16.

As explained above, according to the vehicular door structure of this embodiment, when the impact load F as shown in FIG. 3A and FIG. 3B is applied to the door inner panel 16 made of resin, and deforms the door inner panel 16, the amount of deformation of the inner panel 16 toward the door trim 20 can be limited or reduced. In this embodiment, the collision mode assumed in advance is that in which the impactor collides against a relatively narrow range in the door width direction W.

In the above-described embodiment, the notches 24 as fragile portions are formed in the lower general portion 16B of the door inner panel 16, as shown in FIG. 1. However, the fragile portions may be provided in a range including the entire area of the upper general portion (16A) of the door inner panel (16). Also, in the arrangement in which the door inner panel has no loudspeaker housing portion, for example, the fragile portions may be formed in a range including the entire area of the lower portion of the door inner panel.

In a modified example of the above-described embodiment, the third region A3 through the seventh region A7 of the door inner panel 16 may have ribs as high rigidity portions provided at the same positions in the door vertical direction as the first ribs 26 on the first region A1 and the second region A2, in place of the second ribs 28 and the third ribs 30. Also, in another modified example of the above-described embodiment, the first region A1, second region A2, sixth region A6, and the seventh region A7 of the door inner panel 16 may have ribs formed such that the vertical intervals between the ribs differ from one region to another, as is the case with the second ribs 28 on the third region A3 and the fifth region A5, in place of the first ribs 26 and the third ribs 30. In a further modified example of the above-described embodiment, the first region A1 through fifth region A5 of the door inner panel 16 may have ribs similar to the third ribs 409 on the sixth region A6 and the seventh region A7, in place of the first ribs 26 and the second ribs 28.

In the above-described embodiment, each of the third ribs 30 extends in a direction inclined to the lower side of the door, toward the rear side of the door. However, the third rib 30 may be replaced by a rib that extends in a direction inclined to the upper side of the door, toward the rear side of the door.

Other modified examples of the above-described embodiment will be described using FIG. 4A through FIG. 4E, while also referring to FIG. 1 and FIG. 2 when appropriate. In FIG. 4A through FIG. 4E, a principal part of a door inner panel according to each of the modified examples, as viewed from the door trim side, is illustrated. As shown in FIG. 4A-FIG. 4E, the notches and ribs of these modified example have different configurations or arrangements from the notches 24 and ribs 26, 28, 30 of the above-described embodiment shown in FIG. 1, etc. The other configuration of each of the modified examples is substantially identical with that of the above-described embodiment. In the following explanation, the same reference numerals are assigned to the same or corresponding constituent parts or elements as those of the above-described embodiment. Also, while the configuration or arrangement of the fragile portions and high rigidity portions of the door inner panel in each of the modified examples is different from that of the above-described embodiment, the same reference numeral is assigned to the door inner panel for the sake of convenience, since the other configuration is substantially identical with that of the above-described embodiment.

Figure 4A:
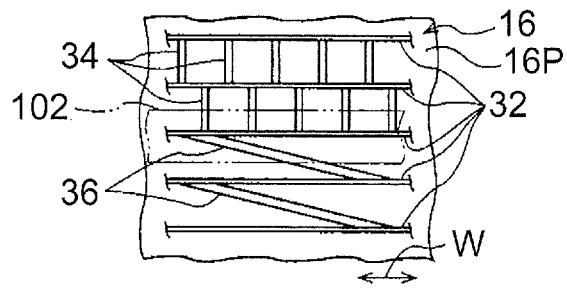

As shown in FIG. 4A, in a first modified example, a plurality of notches 32 as fragile portions are formed in the panel part 16P opposed to the door trim (see FIG. 2) in the door inner panel 16. Each of the notches 32, which is a V-shaped groove as viewed in a vertical cross-section, extends linearly in the door width direction W, and serves as a starting point of bending deformation. The notches 32 are provided in parallel with each other while being spaced at given intervals in the door vertical direction.

On the door inner panel 16, ribs 34, 36 as high rigidity portions are formed between the linear notches 32 located next to each other. The ribs 34, 36 are convex portions formed on the same surface as that in which the notches 32 are formed. The ribs 34, 36 connect the corresponding linear notches 32 located next to each other, and serve to increase the rigidity of regions between the corresponding linear notches 32. The ribs 34 provided in an upper portion in FIG. 4A extend in the door vertical direction, and the ribs 36 in a lower portion in FIG. 4A extend in an oblique direction relative to the door width direction W.

Collision modes assumed in advance in the first modified example are that in which an impactor (such as a barrier that simulates a bumper) collides against a relative narrow range in the door vertical direction. Namely, when a barrier 102 (that simulates a bumper) as an impactor collides with the door outer panel 14 (see FIG. 3A, FIG. 3B), from the outside of the vehicle compartment, and depresses or pushes the door inner panel 16, the door inner panel 16 bends and deforms polygonally, using the linear notches 32 as starting points.

Figure 4B:
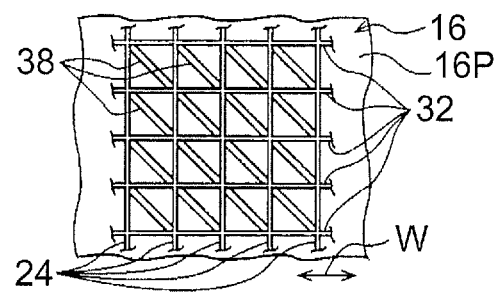

Next, a second modified example shown in FIG. 4B will be described. In the second modified example, a plurality of linear notches 24 similar to those of the above-described embodiment, and a plurality of linear notches 32 similar to those of the first modified example, are formed on the panel part 16P opposed to the door trim (see FIG. 2) in the door inner panel 16. Namely, the linear notches 24 provided in parallel with each other while being spaced at given intervals in the door width direction W, and the linear notches 32 provided in parallel with each other while being spaced at given intervals in the door vertical direction, coexist in the door inner panel 16. The notches 24, 32 are arranged in the form of a lattice, as one example.

On the door inner panel 16, ribs 38 as high rigidity portions are formed between the linear notches 24, 32 located next to each other. The ribs 38 are convex portions formed on the same surface as the surface in which the notches 24, 32 are formed. The ribs 38 connect the corresponding linear notches 24, 32 located next to each other, and serve to increase the rigidity of regions between the corresponding linear notches 24, 32. Each of the ribs 38 extends in an oblique direction relative to the door width direction W, and opposite ends of the rib 38 are located adjacent to the intersection points of the notches 24 and the notches 32. Namely, the ribs 36 form diagonal lines of quadrangles (squares) formed by the notches 24 and the notches 32.

Collision modes assumed in advance in the second modified example are that in which an impactor (such as a pole) collides against a relatively narrow range in the door width direction W, and that in which an impactor (such as a barrier that simulates a bumper) collides against a relatively narrow range in the door vertical direction. When a pole 100 (see FIG. 3A, FIG. 3B) collides with the door outer panel 14 (see FIG. 3A, FIG. 3B), from the outside of the vehicle compartment, and depresses the door inner panel 16, the door inner panel 16 bends and deforms polygonally, using the linear notches 24 as starting points of bending deformation. Also, when a barrier 102 (see FIG. 4A) collides with the door outer panel 14 (see FIG. 3A, FIG. 3B), from the outside of the vehicle compartment, and depresses the door inner panel 16, the door inner panel 16 bends and deforms polygonally, using the linear notches 32 as starting points of bending deformation.

Figure 4C:
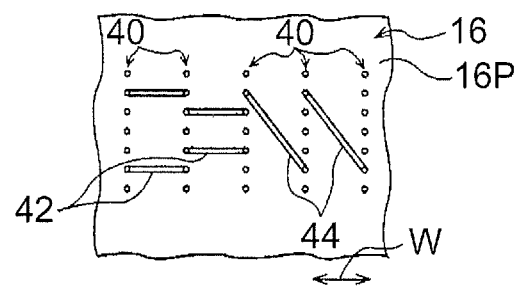

Next, a third modified example shown in FIG. 4C will be described. In the third modified example, a plurality of fragile portions 40 in the form of dotted lines are formed on the panel part 16P opposed to the door trim 20 (see FIG. 2) in the door inner panel 16. The dotline-shaped fragile portions 40 are provided in parallel with each other while being spaced at given intervals in the door width direction W. Each of the dotline-shaped fragile portions 40 consists of concave portions (small-thickness portions) dotted in the door vertical direction. The dotline-shaped fragile portions 40 serve as starting points of bending deformation when an impact load of a given value or larger is applied to the door inner panel 16, from the side of the door outer panel 14 (see FIG. 2).

On the door inner panel 16, ribs 42, 44 as high rigidity portions are formed between the dotline-shaped fragile portions 40 located next to each other. The ribs 42, 44 are formed as convex portions on the surface in which the fragile portions 40 in the form of concave portions are formed. The ribs 42, 44 connect the corresponding dotline-shaped fragile portion 40 located next to each other, and serve to increase rigidity of regions between the dotline-shaped fragile portions 40. The ribs 42 provided in a left portion in FIG. 4C extend in the door width direction W, and the ribs 44 provided in a right portion in FIG. 4C extend in an oblique direction relative to the door width direction W.

Collision modes assumed in advance in the third modified example are that in which an impactor (such as a pole) collides against a relatively narrow range in the door width direction W. Namely, when a pole 100 (see FIG. 3A, FIG. 3B) collides with the door outer panel 14 (see FIG. 3A, FIG. 3B), from the outside of the vehicle compartment, and depresses the door inner panel 16, the door inner panel 16 bends and deforms polygonally, using the dotline-shaped fragile portions 40 as starting points of bending deformation.

Figure 4D:
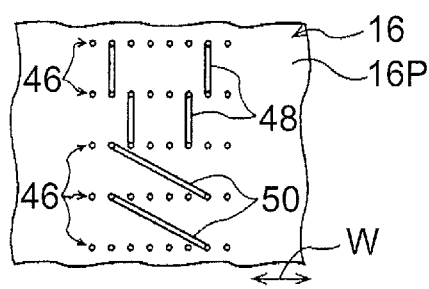

Next, a fourth modified example shown in FIG. 4D will be described. In the fourth modified example, a plurality of fragile portions 46 in the form of dotted lines are formed in the panel part 16P opposed to the door trim 20 (see FIG. 2) in the door inner panel 16. The dotline-shaped fragile portions 46 are provided in parallel with each other while being spaced at given intervals in the door vertical direction. Each of the dotline-shaped fragile portions 46 consists of concave portions (small-thickness portions) dotted in the door width direction W. The dotline-shaped fragile portions 46 serve as starting points of bending deformation when an impact load of a given value or larger is applied to the door inner panel 16, from the side of the door outer panel 24 (see FIG. 2).

On the door inner panel 16, ribs 48, 50 as high rigidity portions are formed between the dotline-shaped fragile portions 46 located next to each other. The ribs 48, 50 are convex portions provided on the surface in which the fragile portions 46 in the form of concave portions are formed. The ribs 48, 50 connect the corresponding dotline-shaped fragile portions 46 located next to each other, and serve to increase rigidity of regions between the corresponding dotline-shaped fragile portions 46 located next to each other. The ribs 48 provided in an upper portion in FIG. 4D extend in the door vertical direction, and the ribs 50 provided in a lower portion in FIG. 4E extend in an oblique direction relative to the door width direction W.

Collision modes assumed in advance in the fourth modified example are that in which an impactor (such as a barrier that simulates a bumper) collides against a relatively narrow range in the door vertical direction. Namely, when a barrier 102 (see FIG. 4A) collides with the door outer panel 14 (see FIG. 3A, FIG. 3B), from the outside of the vehicle compartment, and depresses the door inner panel 16, the door inner panel 16 bends and deforms polygonally, using the dotline-shaped fragile portions 46 as starting points of bending deformation.

Figure 4E:
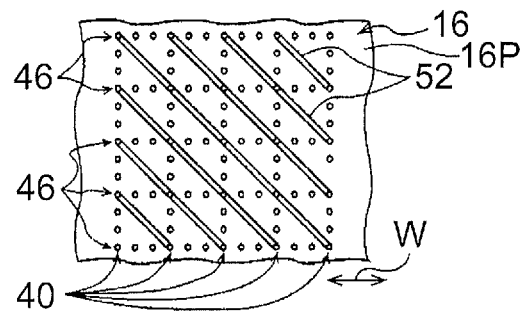

Next, a fifth modified example shown in FIG. 4E will be described. In the fifth modified example, a plurality of fragile portions 40 in the form of dotted lines similar to those of the third modified example, and a plurality of fragile portions 46 in the form of dotted lines similar to those of the fourth modified example, are formed in the panel part 16P opposed to the door trim 20 (see FIG. 2) in the door inner panel 16. Namely, the dotline-shaped fragile portions 40 provided in parallel with each other while being spaced at given intervals in the door width direction W, and the dotline-shaped fragile portions 46 provided in parallel with each other while being spaced at given intervals in the door vertical direction, coexist in the door inner panel 16, and regions that serve as the fragile portions 40 and the fragile portion 46 are also provided.

On the door inner panel 16, ribs 52 as high rigidity portions are formed between the dotline-shaped fragile portions 40, 46 located next to each other. The ribs 52 are convex portions provided on the surface in which the fragile portions 40, 46 in the form of concave portions are formed. The ribs 52 connect the corresponding dotline-shaped fragile portions 40, 46 located next to each other, and serve to increase rigidity of regions between the corresponding dotline-shaped fragile portions 40, 46. Each of the ribs 52 extends in an oblique direction relative to the door width direction W. Opposite ends of the rib 52 are located adjacent to the intersection points (serving as both the fragile portions 40 and the fragile portions 46) of the dotline-shaped fragile portions 40 and the dotline-shaped fragile portions 46.

Collision modes assumed in advance in the fifth modified example include a mode in which an impactor (such as a pole) collides against a relatively narrow range in the door width direction W, and a mode in which an impactor (such as a barrier that simulates a bumper) collides against a relatively narrow range in the door vertical direction. When a pole (see FIG. 3A, FIG. 3B) collides with the door outer panel 14 (see FIG. 3A, FIG. 3B), from the outside of the vehicle compartment, and depresses the door inner panel 16, the door inner panel bends and deforms polygonally, using the dotline-shaped fragile portions 40 as starting points of bending deformation. Also, when a barrier 102 (see FIG. 4A) collides with the door outer panel 14 (see FIG. 3A, FIG. 3B), from the outside of the vehicle compartment, and depresses the door inner panel 16, the door inner panel 16 bends and deforms polygonally, using the dotline-shaped fragile portions as starting points of bending deformation.

The fragile portions formed in the panel part opposed to the door interior member in the door inner panel are not limited to those shown in the above-described embodiment and the above-described modified examples. For example, the fragile portions may be grooves (or notches) having U shape in cross section, linear small-thickness portions, holes, or the like. Also, the intervals between the fragile portions formed in the panel part may not be necessarily constant.

In the embodiment shown in FIG. 1 through FIG. 3B and the modified examples shown in FIG. 4A through FIG. 4E, the notches 24, 32 as linear fragile portions and the dotline-shaped fragile portions 40, 46 are formed in the inside surface of the door inner panel (the surface opposed to the door trim 20). However, these notches may be formed in the outside surface of the door inner panel (the surface opposed to the door outer panel 14).

In the embodiment shown in FIG. 1 through FIG. 3B and the modified examples shown in FIG. 4A through FIG. 4E, the notches 24, 32 as linear fragile portions and the dotline-shaped fragile portions 40, 46 are in the form of straight lines. However, the linear or dotline-shaped fragile portions may be, for example, curved in some degree.

While the notches 24 as linear fragile portions and the dotline-shaped fragile portions 40 extend in the door vertical direction, in the above-described embodiment and the second, third and fifth modified examples, the linear or dotline-shaped fragile portions may extend in a direction that is slightly inclined relative to the door vertical direction. Also, while the notches 32 as linear fragile portions and the dotline-shaped fragile portions extend in the door width direction W in the first, second, fourth and fifth modified examples, the linear or dotline-shaped fragile portions may extend in a direction that is slightly inclined relative to the door width direction W.

While the ribs 26, 28, 30, 34, 36, 38, 42, 44, 48, 50, 52 are formed on the door inner panel 16, in the above-described embodiment and the above-described modified examples, these ribs may not be formed. Namely, high rigidity portions may not be formed between the linear or dotline-shaped fragile portions located next to each other.

In the above-described embodiment and the above-described modified examples, the high rigidity portions formed on the door inner panel are in the form of the ribs 26, 28, 30, 34, 36, 38, 42, 44, 48, 50, and 52. However, the high rigidity portions may be other types of high rigidity portions, such as concave bent portions formed by bending the panel part into concave shape as seen in cross-section, convex bent portions formed by bending the panel part into convex shape as seen in cross-section, large-thickness portions, or the like.

In a further modified example of the above-described embodiment and the above-described modified examples, the high rigidity portion formed on the door inner panel may be a rib that extends in such a direction as to connect the linear or dotline-shaped fragile portions located next to each other, and an end portion(s) (opposite end portions or one end portion) of the rib in the direction of extension does not reach the corresponding fragile portion(s), or may be a lattice-like or circular rib as viewed from the front of the door, which is provided between the fragile portions located next to each other. Namely, the high rigidity portion formed on the door inner panel is not necessarily required to connect the fragile portions located next to each other.

While the vehicular door is the side door in the above-described embodiment, the vehicular door may be another vehicular door, such as a back door located on the rear side of the vehicle. Also, while the side door as the vehicular door is a swing-type side door provided such that it can pivot about a door hinge in the above-described embodiment, the side door as the vehicular door may be a side door that is not of the swing type; for example, it may be a slide door that slides in the vehicle longitudinal direction, or a gull-wing type side door that is flipped upwardly of the vehicle.

While the door inner panel is made of carbon-fiber reinforced resin (CFRP) in the above-described embodiment, the door inner panel may be made of another fiber reinforced resin (FRP), such as glass-fiber reinforced resin (GFRP), or may be made of a resin material that contains no fibers.

The invention may be implemented by suitably combining the above-described embodiment and the above-described modified examples.

While one embodiment of the invention has been described above, it is to be understood that the invention is not limited to the above-described embodiment, but may be embodied with various changes or modifications.

What is claimed is:

1. A vehicular door structure comprising:
a door outer panel; and
a door inner panel that is made of a resin, the door inner panel comprising:
a first side that is opposed to the door outer panel;
a second side that is opposed to a door interior member, the door interior member facing a vehicle interior; and
a panel part that has a plurality of fragile portions that are more fragile than other portions of the panel part, the fragile portions being formed as grooves, holes or concave portions, and being provided in parallel with each other while being spaced from each other in at least one direction of a door width direction and a door vertical direction, wherein
each of the fragile portions have a linear shape or dotline shape,
each of the fragile portions having the linear shape or the dotline shape defines a line extending in a first direction, and
the door inner panel has a rib having a higher rigidity than the fragile portion and portions of the panel part other than the fragile portion, the rib is provided between fragile portions located adjacent to each other,
the rib is not provided on the lines defined by the fragile portions, and
the rib is provided between adjacent fragile portions and connects the adjacent fragile portions, the rib extending in a second direction, different from the first direction.

2. The vehicular door structure according to claim 1, wherein the panel part is opposed to the door interior member.

3. The vehicular door structure according to claim 2, wherein:
the rib is configured to increase rigidity of a region between the fragile portions.

4. The vehicular door structure according to claim 3, wherein the rib extends in an oblique direction relative to the door width direction.

5. The vehicular door structure according to claim 3, wherein the rib comprises a large-thickness portion having a larger thickness than the other portions of the panel part.

6. The vehicular door structure according to claim 1, wherein two adjacent lines each defined by two adjacent fragile portions are parallel with each other.

* * * * *